(12) United States Patent
Nelson et al.

(10) Patent No.: US 6,997,406 B2
(45) Date of Patent: Feb. 14, 2006

(54) HOSE WEIGHT WITH BALLAST

(75) Inventors: Craig Nelson, Walla Walla, WA (US); Cliff P. Ungerecht, Walla Walla, WA (US)

(73) Assignee: Nelson Irrigation Corporation, Walla Walla, WA (US)

( * ) Notice: Subject to any disclaimer, the term of this patent is extended or adjusted under 35 U.S.C. 154(b) by 0 days.

(21) Appl. No.: 10/834,855

(22) Filed: Apr. 30, 2004

(65) Prior Publication Data

US 2005/0242573 A1    Nov. 3, 2005

(51) Int. Cl.
*B05B 3/00*    (2006.01)
(52) U.S. Cl. .................................. 239/723; 222/464.4
(58) Field of Classification Search ........ 239/159–170, 239/734, 726, 722, 723; 285/5, 61; 138/114, 138/148, 149; 248/325, 334.1; 222/464.4
See application file for complete search history.

(56) References Cited

U.S. PATENT DOCUMENTS

| | | | |
|---|---|---|---|
| 1,435,674 A | 11/1922 | Varga | |
| 1,828,678 A | 10/1931 | Peterman et al. | |
| 2,120,155 A | 6/1938 | Shera | |
| 2,407,682 A | 9/1946 | Poz | |
| 2,765,487 A | 10/1956 | Foster | |
| 3,889,313 A | 6/1975 | Hulthen | |
| 4,676,438 A | 6/1987 | Sesser | |
| 4,795,100 A | 1/1989 | Purtell et al. | |
| 4,949,905 A | 8/1990 | Jones et al. | |
| 5,267,695 A | 12/1993 | Thayer | |
| 5,311,909 A | 5/1994 | Adcock | |
| 5,333,796 A | 8/1994 | Purtell et al. | |
| 5,465,458 A | 11/1995 | Schlager | |
| 6,343,749 B1 * | 2/2002 | Thom | ............................ 239/1 |
| 6,382,525 B1 * | 5/2002 | Santiesteban et al. | .. 239/222.11 |
| 6,554,233 B1 | 4/2003 | Ungerecht | |
| 6,808,135 B1 * | 10/2004 | Landry | ....................... 239/723 |

* cited by examiner

*Primary Examiner*—David A. Scherbel
*Assistant Examiner*—Seth Barney
(74) *Attorney, Agent, or Firm*—Nixon & Vanderhye P.C.

(57) ABSTRACT

A weight component for an irrigation drop tube includes an elongated, hollow core sleeve, the core sleeve having a radially outwardly directed shoulder at one end connected to a radially outer skirt. A weight sleeve is supported at one end by the shoulder, inside the outer skirt, such that a chamber is created between the core sleeve and the weight sleeve. This chamber is at least partially filled with ballast material, and a cap closes the chamber at an opposite end of the weight sleeve.

21 Claims, 2 Drawing Sheets

HOSE WEIGHT WITH BALLAST

This invention relates to sprinkler heads used on linear and center pivot irrigation systems and, specifically, to a weight used to stabilize a sprinkler head suspended from a water supply pipe.

BACKGROUND OF THE INVENTION

Linear and center pivot irrigation systems typically include elevated lateral water supply pipes or booms supported on mobile, wheeled carriages. Sprinkler heads are usually mounted directly on the boom, or suspended from the boom by flexible hoses, often referred to as "drop" tubes or hoses. The latter arrangement is employed to locate the sprinkler heads closer to the ground and/or crops. It is often necessary, however, to stabilize the sprinkler heads when so suspended, so as to minimize the effects of wind, torque due to rotation of the sprinkler head, and even engagement with tall crops, such as corn.

It is well known to provide weights in the form of relatively rigid plastic sleeves that are slidably received over the drop hose and that fall under the force of gravity to the lower region of the plastic hose, with the sprinkler head serving as a stop. The sprinkler head itself is secured to the hose utilizing a conventional two-piece connector. One part of the connector has a barbed end to be inserted into the hose. A second metal band (for example, an Oetiker-type clamp) clamps the hose end to the barbed end of the first connector part.

It is also known to slide a donut-shaped weight over the flexible drop hose, also located by gravity above the connector and/or sprinkler. Some are designed to slide over part of, and locate on, the sprinkler component itself. Such weights are typically made of cast iron, zinc or concrete. Materials chosen are typically designed around a desired 1–2 lb. weight.

It is also known to insert a galvanized pipe or polyethylene tube axially between the flexible hose and sprinkler component, the pipe adding the weight necessary for stability, and helping to straighten the drop hose.

In recently issued, commonly owned U.S. Pat. No. 6,554,233, there is disclosed a combined hose clamp and weight in the form of two identical half-sleeves with an interior profile that includes a pair of annular, axially spaced ribs, at least one of which is always available to clamp the hose end between the rib and the barbed end of the insert component of the connector.

BRIEF DESCRIPTION OF THE INVENTION

The present invention provides a hose and weight component that includes a hollow core slidably received over a hose end. The core includes a center sleeve portion that is formed integrally with a tapered support shoulder formed at one end thereof, with an internally threaded neck portion extending from the shoulder. The neck is adapted to threadably engage an adapter that is press fit in the hose end. The tapered shoulder connects to a radially outer cylindrical skirt that has a diameter sufficiently large to receive one end of a weight sleeve, with that end of the weight sleeve effectively closed by the shoulder and the center core sleeve. This arrangement provides an annular chamber between the weight sleeve and the core sleeve that is adapted to hold a loose fill or ballast material such as sand or soil. A cap with a center hole that accommodates the core sleeve and the hose is then attached to the opposite end of the weight sleeve so as to close that end of the weight sleeve after the ballast material has been added.

After locating the weight on the hose end, the weight may be rotated to thread the neck portion on a first extended thread on the adapter. The opposite end of the adapter is also threaded, enabling attachment of a sprinkler head, pressure regulator or other sprinkler component.

Accordingly, in one aspect, the invention relates to a hose weight for an irrigation drop hose comprising an inner core sleeve adapted to slide over a drop hose; an outer weight sleeve surrounding the inner core sleeve and closed at opposite ends to create a chamber between the inner core sleeve and the outer weight sleeve, the chamber filled with ballast material.

In another aspect, the present invention relates to a weight component for an irrigation drop hose comprising an elongated, hollow core sleeve having a first diameter and adapted to be received over an end portion of the drop hose, the core sleeve having a radially outwardly directed shoulder at one end connected to a radially outer skirt; a weight sleeve supported at one end by the shoulder, inside the outer skirt, such that a chamber is created between the core sleeve and the weight sleeve, the chamber at least partially filled with ballast material; and a cap closing the chamber at an opposite end of the weight sleeve.

In still another aspect, the present invention relates to a drop hose and weight assembly comprising a hose adapted for suspension from an irrigator boom, a remote end of the hose having an adapter fitting secured thereto, the adapter fitting having two axially spaced, externally threaded portions axially beyond the remote end of the hose; and a weight component comprising an elongated, hollow core sleeve received over an end portion of the drop hose, the core sleeve having a radially outwardly directed shoulder at one end connected to a radially outer skirt; a weight sleeve supported at one end by the shoulder, inside the outer skirt such that a chamber is created between the core sleeve and the weight sleeve, the annular chamber at least partially filled with ballast material; and a cap closing the chamber at an opposite end of the weight sleeve.

The invention will now be described in detail in connection with the drawings identified below.

DETAILED DESCRIPTION OF THE INVENTION

Figure 1:
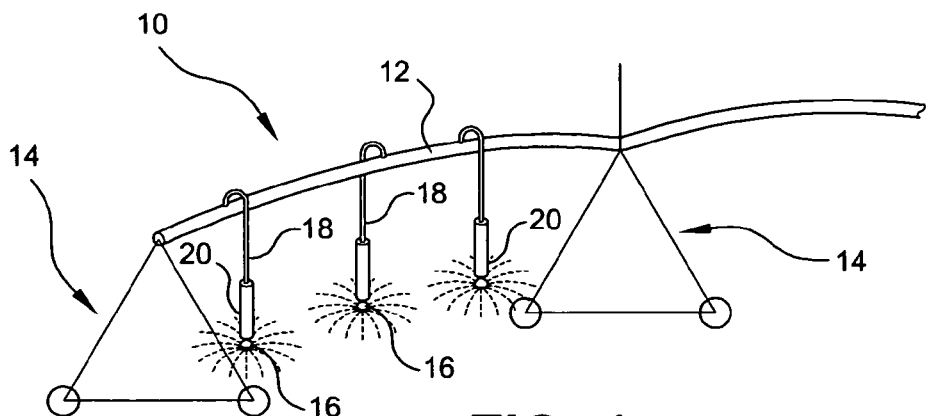
FIG. 1 is a partial perspective of a conventional irrigation apparatus utilizing weights to stabilize sprinklers suspended from an overhead water supply pipe.

With reference to FIG. 1, conventional irrigation apparatus 10, which could be of the linear or pivot type, includes an elevated water supply conduit or pipe 12, supported on wheeled carriages 14. Sprinkler heads 16 may be mounted directly on the pipe 12 or may be suspended from the pipe by means of flexible tubes or hoses 18. In the latter case, a conventional hose end connector (not visible in FIG. 1) is inserted into the hose end and clamped by means of, for example, an Oetiker ear type clamp, or a screw-type clamp ring. Solid plastic sleeve weights 20 typically 18–24 inches in length are telescoped over the flexible hose 18 and are stopped by an exposed flange on the hose end connector or by the sprinkler head itself.

Figure 2:
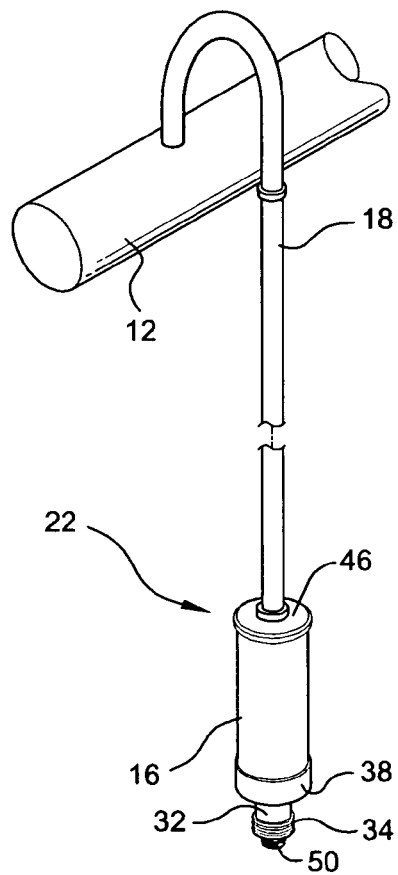
FIG. 2 is an enlarged detail of a sprinkler suspended by a flexible hose, along with a drop weight in accordance with one embodiment of the invention.
Figure 3:
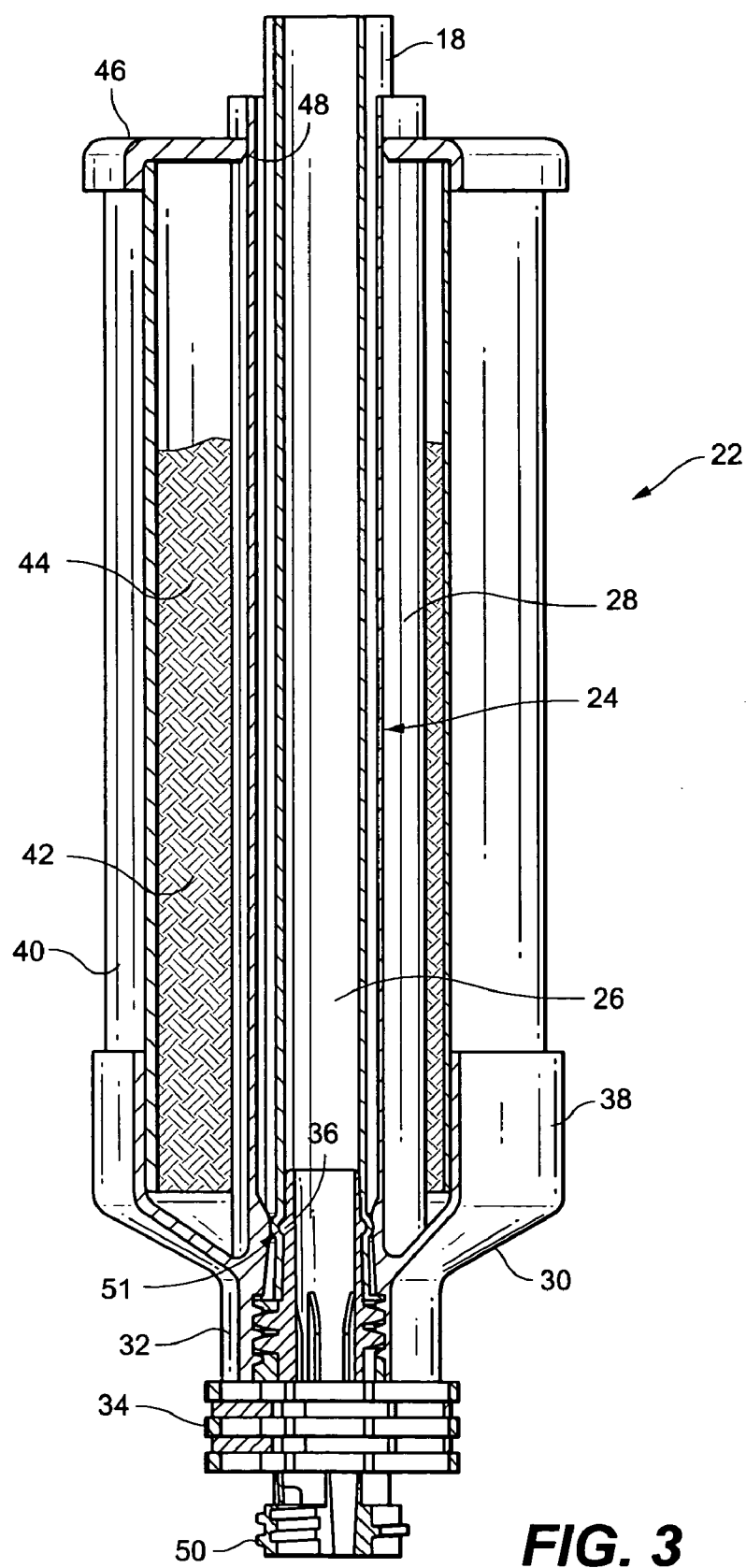
FIG. 3 is a side elevation, partly in section, of a hose weight in accordance with an exemplary embodiment of the invention.

Turning now to FIGS. 2 and 3, the present invention provides a hose end weight component 22 that includes a hollow core 24 that is slidably received over a hose end 26. The core 24 includes a center or core sleeve portion 28 that is integral with a weight support shoulder 30. The weight support shoulder is formed with an internally threaded neck 32 that is essentially a continuation of the core sleeve but with a slightly larger diameter. The neck 32 is adapted to threadably engage an adapter 34, one end of which is press fit into the hose end. In this regard, note the rib 36 on the adapter and the conforming groove in the hose end. The tapered shoulder 30 connects to a radially outer cylindrical skirt 38 that has a diameter sufficiently large to receive one end of the weight sleeve 40 in a light press-fit engagement, and thus center the sleeve 40 relative to the core sleeve 28. The end of the weight sleeve 40 received in the core skirt 38 is effectively closed by the shoulder 30 and core sleeve 28. This arrangement creates an annular chamber 42 between the weight sleeve 40 and the core sleeve 28 that can hold a loose fill or ballast material 44 such as sand or soil. Typically, 1 or 2 pounds of ballast is sufficient. A cap 46 with a center hole 48 that accommodates the core sleeve 28 and hose 18, is attached to the upper end of the weight sleeve 44 to close that end of the sleeve, after the ballast 44 has been added.

In the normal course, the weight sleeve 40 and core sleeve 28 will be assembled and filled prior to telescoping the weight assembly over the hose. In doing so, the thickened wall of the core sleeve at 51 bears directly on the rib 36 via the hose end wall, providing a clamping action on the hose between the core and the adapter. After locating the weight 22 on the hose end 26, the weight is rotated to thread the neck portion 32 on the first external thread 50 on the adapter 34 to secure the weight in place. The opposite end of the adapter 34 is threaded at 50 and is adapted to receive a sprinkler head, pressure regulator or other sprinkler component. A typical arrangement would have a pressure regulator attached to the adapter 34 and a sprinkler head attached to the regulator.

It will be appreciated that the core 24 and weight sleeve 40 may be made of plastic or other suitable material, and that the shape of the weight sleeve may be round, square, or multi-sided in shape. The connection between the adapter 34 and hose end 26 is not limited to that which is illustrated but may include other conventional connections as well.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A weight component for an irrigation drop hose comprising an elongated, hollow core sleeve having a first diameter and adapted to be received over an end portion of the drop hose, said core sleeve having a radially outwardly directed shoulder at one end connected to a radially outer skirt; a weight sleeve supported at one end by said shoulder, inside said outer skirt, such that a chamber is created between said core sleeve and said weight sleeve, said chamber at least partially filled with ballast material; and a cap closing said chamber at an opposite end of said weight sleeve.

2. The weight component of claim 1 wherein said core sleeve is formed with a neck portion projecting from said shoulder, said neck portion having an internal thread enabling connection to an adapter connected to the drop hose.

3. The weight component of claim 1 wherein said outer skirt is round, with a diameter larger than said first diameter; and further wherein said weight sleeve is cylindrical in shape, with a diameter that permits a press fit between said weight sleeve and said outer skirt.

4. The weight component of claim 1 wherein said ballast material comprises sand.

5. The weight component of claim 1 wherein said ballast material comprises soil.

6. The weight component of claim 1 wherein said ballast material weighs about 1 pound.

7. The weight component of claim 1 wherein said ballast material weighs about 2 pounds.

8. The weight component of claim 3 wherein said ballast material comprises sand and weighs about 2 pounds.

9. The weight component of claim 1 wherein said core sleeve and said weight sleeve are comprised of plastic material.

10. A drop hose and weight assembly comprising a hose adapted for suspension from an irrigator boom, a remote end of the hose having an adapter fitting secured thereto, said adapter fitting having two axially spaced, externally threaded portions axially beyond said remote end of said hose; and a weight component comprising an elongated, hollow core sleeve received over an end portion of the drop hose, said core sleeve having a radially outwardly directed shoulder at one end connected to a radially outer skirt; a weight sleeve supported at one end by said shoulder, inside said outer skirt such that a chamber is created between said core sleeve and said weight sleeve, said annular chamber at least partially filled with ballast material; and a cap closing said chamber at an opposite end of said weight sleeve.

11. The drop hose and weight assembly of claim 10 wherein said core sleeve is formed with a neck portion adjacent said shoulder, said neck portion having an internal thread enabling connection to one of said two axially spaced externally threaded portions of said adapter.

12. The drop hose and weight assembly of claim 11 wherein a sprinkler component is threaded to the other of said two axially spaced externally threaded portions of said adapter.

13. The drop hose and weight assembly of claim 12 wherein said sprinkler component comprises a sprinkler head.

14. The drop hose and weight assembly of claim 10 wherein said outer skirt is round, with a diameter larger than said first diameter; and further wherein said weight sleeve is cylindrical in shape, with a diameter that permits a press fit between said weight sleeve and said outer skirt.

15. The drop hose and weight assembly of claim 10 wherein said ballast material comprises sand.

16. The drop hose and weight assembly of claim 10 wherein said ballast material comprises soil.

17. The drop hose and weight assembly of claim 10 wherein said ballast material weighs about 1 pound.

18. The drop hose and weight assembly of claim 10 wherein said ballast material weighs about 2 pounds.

19. The drop hose and weight assembly of claim 10 wherein said ballast material comprises sand and weighs about 2 pounds.

20. The drop hose and weight assembly of claim 10 wherein said core sleeve and said weight sleeve are comprised of plastic material.

21. A hose weight for an irrigation drop hose comprising an inner core sleeve sized to permit the drop hose to extend through substantially the entire length of said inner core sleeve; an outer weight sleeve surrounding said inner core sleeve and closed at opposite ends to create a closed chamber between said inner core sleeve and said outer weight sleeve, said chamber filled with ballast material.

* * * * *